US010787765B2

(12) United States Patent
Irnich et al.

(10) Patent No.: US 10,787,765 B2
(45) Date of Patent: Sep. 29, 2020

(54) LOW-SOLVENT COATING SYSTEMS FOR TEXTILES

(71) Applicant: Covestro Deutschland AG, Leverkusen (DE)

(72) Inventors: Rolf Irnich, Shanghai (CN); Jürgen Köcher, Langenfeld (DE); Rafael Langer, Odenthal (DE)

(73) Assignee: Covestro Deutschalnd AG, Leverkusen (DE)

( * ) Notice: Subject to any disclaimer, the term of this patent is extended or adjusted under 35 U.S.C. 154(b) by 0 days.

(21) Appl. No.: 16/064,861

(22) PCT Filed: Dec. 22, 2015

(86) PCT No.: PCT/CN2015/098310
§ 371 (c)(1),
(2) Date: Jun. 21, 2018

(87) PCT Pub. No.: WO2017/107064
PCT Pub. Date: Jun. 29, 2017

(65) Prior Publication Data
US 2019/0017221 A1 Jan. 17, 2019

(51) Int. Cl.
C08G 18/72 (2006.01)
D06N 3/14 (2006.01)
C08G 18/48 (2006.01)
C08G 18/78 (2006.01)
C08G 18/76 (2006.01)
C08G 18/75 (2006.01)
C08G 18/80 (2006.01)
C09D 175/08 (2006.01)
C08G 18/73 (2006.01)
C09D 175/02 (2006.01)
C09D 175/00 (2006.01)
C08G 18/32 (2006.01)

(52) U.S. Cl.
CPC .......... *D06N 3/14* (2013.01); *C08G 18/3225* (2013.01); *C08G 18/4804* (2013.01); *C08G 18/485* (2013.01); *C08G 18/4812* (2013.01); *C08G 18/4816* (2013.01); *C08G 18/4825* (2013.01); *C08G 18/4829* (2013.01); *C08G 18/4837* (2013.01); *C08G 18/4879* (2013.01); *C08G 18/722* (2013.01); *C08G 18/724* (2013.01); *C08G 18/73* (2013.01); *C08G 18/755* (2013.01); *C08G 18/7671* (2013.01); *C08G 18/78* (2013.01); *C08G 18/807* (2013.01); *C08G 18/8093* (2013.01); *C09D 175/00* (2013.01); *C09D 175/02* (2013.01); *C09D 175/08* (2013.01); C08G 18/76 (2013.01); D06N 2209/1635 (2013.01); D06N 2211/10 (2013.01); D06N 2211/106 (2013.01); D06N 2211/14 (2013.01); D06N 2211/263 (2013.01)

(58) Field of Classification Search
CPC . C08G 18/3234; C08G 18/285; C08G 18/722
See application file for complete search history.

(56) References Cited

U.S. PATENT DOCUMENTS

| 3,770,703 | A | * | 11/1973 | Gruber et al. | C08G 18/10 528/45 |
| 4,038,198 | A | * | 7/1977 | Wagner | C07D 201/18 252/183.13 |
| 4,248,756 | A | | 2/1981 | König et al. | |
| 4,373,081 | A | | 2/1983 | Nachtkamp et al. | |
| 5,071,937 | A | * | 12/1991 | Potter | C08G 18/10 528/45 |
| 5,126,170 | A | | 6/1992 | Zwiener et al. | |
| 5,130,402 | A | * | 7/1992 | Akiyama | C08G 18/10 524/101 |
| 5,214,086 | A | | 5/1993 | Mormile et al. | |
| 5,236,741 | A | | 8/1993 | Zwiener et al. | |
| 5,243,012 | A | | 9/1993 | Wicks et al. | |
| 5,364,955 | A | | 11/1994 | Zwiener et al. | |
| 5,412,056 | A | | 5/1995 | Zwiener et al. | |
| 5,489,704 | A | | 2/1996 | Squiller et al. | |
| 5,559,204 | A | | 9/1996 | Squiller et al. | |
| 5,623,045 | A | | 4/1997 | Zwiener et al. | |
| 5,736,604 | A | | 4/1998 | Luthra | |

(Continued)

FOREIGN PATENT DOCUMENTS

CA 2048444 C 8/2003
CA 2163169 C 10/2006

(Continued)

OTHER PUBLICATIONS

Szycher. Jul. 13, 2012, Structure-Property Relations in Polyurethanes from: Szycher's Handbook of Polyurethanes CRC Press Accessed on Apr. 9, 2020 https://www.routledgehandbooks.com/doi/10.1201/b12343-4 (Year: 2012).*

(Continued)

*Primary Examiner* — Michael M Dollinger
(74) *Attorney, Agent, or Firm* — Faegre Drinker Biddle & Reath LLP

(57) ABSTRACT

Provided is a coating composition for the elastic coating of textile materials, comprising at least one blocked, isocyanate-terminated prepolymer (component A), the isocyanate-terminated prepolymer A) being prepared from a polyol component a) IN and an isocyanate component b), and the terminal isocyanate groups being blocked with dialkyl malonate and/or 3,5-dimethylpyrazole, and the isocyanate component b) containing ≥70 wt % of at least one aliphatic polyisocyanate and ≤30 wt % of at least one N aromatic polyisocyanate, based on the total weight of component b), at least one polyamine (component B) and ≤30 wt %, based on the total mass of the coating composition, of at least one organic solvent. Further provided are a method for coating substrates with the coating composition, and also the substrate obtainable in such a method, and, further, the use of the coating composition for producing elastic coatings or elastic films.

13 Claims, No Drawings

(56) References Cited

U.S. PATENT DOCUMENTS

| | | | |
|---|---|---|---|
| 5,789,518 A * | 8/1998 | Yao | C08G 18/0804 |
| | | | 252/182.2 |
| 5,847,195 A | 12/1998 | Roesler | |
| 5,863,983 A * | 1/1999 | Wu | C08G 18/0828 |
| | | | 524/539 |
| 6,005,062 A | 12/1999 | Hansen et al. | |
| 6,183,870 B1 | 2/2001 | Hergenrother et al. | |
| 6,355,829 B2 | 3/2002 | Roesler et al. | |
| 6,458,293 B1 | 10/2002 | Roesler et al. | |
| 6,482,333 B1 | 11/2002 | Roesler et al. | |
| 8,772,434 B2 | 7/2014 | Asahina et al. | |
| 9,404,020 B2 | 8/2016 | Grablowitz et al. | |
| 2002/0165334 A1 | 11/2002 | Melchiors et al. | |
| 2004/0067318 A1 | 4/2004 | Jones et al. | |
| 2005/0159560 A1 | 7/2005 | Danielmeier et al. | |
| 2010/0256324 A1 | 10/2010 | Asahina et al. | |
| 2014/0378609 A1 * | 12/2014 | Yamasaki | C09D 11/324 |
| | | | 524/590 |
| 2015/0343604 A1 * | 12/2015 | Kimura | B24B 37/24 |
| | | | 51/296 |

FOREIGN PATENT DOCUMENTS

| | | |
|---|---|---|
| CN | 101896528 A | 11/2010 |
| CN | 104350078 A | 2/2015 |
| DE | 2902090 A1 | 7/1980 |
| DE | 19914885 A1 | 10/2000 |
| EP | 053766 A1 | 6/1982 |
| EP | 0403921 A2 | 12/1990 |
| EP | 0470461 A2 | 2/1992 |
| EP | 667362 A1 | 8/1995 |
| WO | WO-2015033939 A1 | 3/2015 |

OTHER PUBLICATIONS

International Search Report for PCT/CN2015/098310 dated Sep. 18, 2016.

Written Opinion of the International Searching Authority for PCT/CN2015/098310 dated Sep. 18, 2016.

* cited by examiner

LOW-SOLVENT COATING SYSTEMS FOR TEXTILES

CROSS-REFERENCE TO RELATED APPLICATIONS

This application is a national stage application (under 35 U.S.C. § 371) of PCT/CN2015/098310, filed Dec. 22, 2015, which is incorporated herein by reference in its entirety.

The present invention relates to a specific, low-solvent coating composition for the elastic coating of textile materials, comprising component A), at least one blocked, isocyanate-terminated prepolymer, and component B), at least one polyamine. Further provided by the invention are a method for coating substrates with the coating composition of the invention, and also the substrate obtainable in such a method, and, further, the use of the coating composition of the invention for producing elastic coatings or elastic films.

BACKGROUND OF THE INVENTION

Low-solvent coating compositions for textiles, based on polyurethaneureas, are common knowledge and described for example in DE 2 902 090 A1. These coating compositions comprise two constituents, a ketoxime-blocked polyisocyanate and a compound having two amino groups, which react with one another at temperatures above 120° C. At these temperatures the ketoxime groups are eliminated and the NCO groups are liberated and are available for reaction with the amine component. The systems described also have good stability on storage at ambient temperatures. From the coating compositions, elastic films can be obtained that exhibit high mechanical stability. On film formation, however, ketoximes are released, such as butanone oxime. Butanone oxime is presently suspected of being a substance possibly injurious to health. At the present time evaluations of this compound are being conducted in order to evaluate its toxicology. Depending on the outcome of those studies, there might be changes in the use of this product in certain sectors, either through an obligation to perform additional monitoring measures, or there may be a desire for substitution of this product.

Consequently there is a continual requirement for alternative, low-solvent coating compositions which are stable on storage at ambient temperature and whose crosslinking, full reaction and/or film forming are not accompanied by release of ketoximes. In spite of this, the resulting coatings ought to have the advantageous properties of the systems known in the prior art. It would be advantageous, moreover, if the blocking agents were eliminated at somewhat lower temperatures, allowing energy to be saved in the coating operation.

Among alternative blocking systems known in the prior art are dialkyl malonate-blocked polyisocyanates, their use in storage-stable, low-solvent coating systems for metals also being known, and such systems having been already described in EP 053 766 A1. The NCO groups of the blocked polyisocyanates can be liberated at temperatures of 90-100° C. (U. Röckrath, K. Brockkötter, Th. Frey, U. Poth, G. Wigger, Prog. Org. Coat. 32, 1997, 173-182) and they react fully with polyol components. Deblocking is accomplished by a process of transesterification, meaning that only ethanol is given off, rather than the blocking agent as a whole. Polyol components used in the prior art are polyester polyols. The coating systems described are unsuitable, however, for the coating of textiles, since they do not form an elastic film having sufficient mechanical properties. Likewise known as blocking agents for polyisocyanates are dimethylpyrazoles (D. A Wicks and Zeno W. Wicks Jr., Progress in Organic Coatings 43 (2001), 131-140; D. A. Wicks and Zeno W. Wicks Jr., Progress in Organic Coatings 36 (1999), 148-172).

Furthermore, a problem which arises in the blocking of the known, polyurethaneurea-based, low-solvent coating compositions for textiles (according to DE 2 902 090 A1, for example) is that when the blocking agent is switched from ketoximes to, say, dialkyl malonates or dimethylpyrazole, the compositions lack sufficient stability on storage at room temperature (pot life). This means that after the two components have been mixed, the viscosity rises so sharply that working is no longer possible after just a short time at room temperature.

BRIEF SUMMARY OF THE INVENTION

It was an object of the present invention, therefore, to provide low-solvent coating systems which are suitable for textile coating, which are stable on storage at ambient temperature and which do not release ketoximes in the coating process. It ought, moreover, to be possible to crosslink the coatings at relatively low temperatures, and the resulting films ought to have good elastic and mechanical properties.

This object has been achieved in accordance with the invention by a coating composition for the elastic coating of textile materials, comprising at least one blocked, isocyanate-terminated prepolymer (component A), the isocyanate-terminated prepolymer A) being prepared from a polyol component a) and an isocyanate component b), and the terminal isocyanate groups being blocked with dialkyl malonate and/or 3,5-dimethylpyrazole, and the isocyanate component b) containing ≥70 wt % of at least one aliphatic polyisocyanate and ≤30 wt % of at least one aromatic polyisocyanate, based on the total weight of component b), at least one polyamine (component B) and ≤30 wt %, based on the total mass of the coating composition, of at least one organic solvent.

It has surprisingly been found that the low-solvent coating compositions of the invention are suitable for the coating of textiles and form elastic films having good mechanical properties without release of ketoximes. The coating compositions of the invention, in particular, also exhibit a sufficiently low stability on storage at room temperature. This is not the case when using prepolymers which are based purely on aromatic polyisocyanates or which have a high fraction of aromatic polyisocyanates.

DETAILED DESCRIPTION OF THE INVENTION

The coating composition comprises a blocked, isocyanate-terminated prepolymer (component A), the isocyanate-terminated prepolymer A) being prepared from a polyol component a) and an isocyanate component b), and the terminal isocyanate groups being blocked with dialkyl malonate or 3,5-dimethylpyrazole, and the isocyanate component b) comprising ≥70 wt % of at least one aliphatic polyisocyanate and ≤30 wt % of at least one aromatic polyisocyanate, based on the total weight of component b).

The coating composition comprises preferably 30 to 90 wt % and more preferably 50 to 90 wt % of component A), based on the total mass of the coating composition.

In accordance with the invention, the polyol component a) used for preparing the prepolymer A) comprises preferably at least one polyol having a number-average molecular weight Mn of 2000 to 8000 g/mol, preferably 2500 to 7000 g/mol and very preferably of 3000 to 6500 g/mol and an average functionality of hydroxyl groups of 1.5 to 4.0, more preferably 1.8 to 3.5 and very preferably 2.0 to 3.0.

The number-average molecular weight for the purposes of this specification is always determined by gel permeation chromatography (GPC) in tetrahydrofuran at 23° C. The procedure for this is in accordance with DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 μm; RID detector). Calibration takes place using polystyrene samples of known molar mass. The number-average molecular weight is calculated with software assistance. Baseline points and evaluation limits are specified in accordance with DIN 55672 Part 1.

Through the variation in the number-average molecular weights and in the functionality of the polyols it is possible to influence the properties of the resultant films, such as elasticity, moduli and water swelling, for example.

In one particularly preferred embodiment the polyol component a) comprises or consists of a mixture comprising at least one polyol having a number-average molecular weight Mn of 2000 to 8000 g/mol, preferably 2500 to 7000 g/mol and very preferably of 3000 to 6500 g/mol and having an average OH functionality of preferably 1.5 to 4.0, more preferably 1.8 to 3.5 and very preferably 2.0 to 3.0, and at least on polyol having a number-average molecular weight Mn of 300 to 1000 g/mol, preferably 350 to 700 g/mol, and having an average OH functionality of preferably 1.5 to 4.0, more preferably 1.8 to 3.5 and very preferably 2.0 to 3.0.

In one particularly preferred embodiment the polyol component a) comprises or consists of a mixture comprising at least one polyol having a number-average molecular weight Mn of 2000 to 8000 g/mol, preferably 2500 to 7000 g/mol and very preferably of 3000 to 6500 g/mol and having an average OH functionality of preferably 1.5 to 4.0, more preferably 1.8 to 3.5 and very preferably 2.0 to 3.0, at least on polyol having a number-average molecular weight Mn of 300 to 1000 g/mol, preferably 350 to 700 g/mol, and having an average OH functionality of preferably 1.5 to 2.7, more preferably 1.8 to 2.5 and very preferably 1.9 to 2.1, and at least one polyol having a number-average molecular weight Mn of 300 to 1000 g/mol, preferably 350 to 700 g/mol, and having an average OH functionality of more preferably 2.8 to 3.5 and very preferably 2.9 to 3.1.

Compounds with suitability as polyol component a) are, in particular, polyester polyols, polyether polyols, polycarbonate polyols, polyetherpolycarbonate polyols and/or polyester-polycarbonate polyols. With particular preference the polyol component a) comprises or consists of polyether polyols.

As polyol component for preparing the polyurethane prepolymers A) it is possible to use polyether polyols of relatively high molecular mass that are known per se from polyurethane chemistry and are obtainable in a conventional way by alkoxylation of suitable starter molecules.

Suitable starter molecules are, for example, simple polyols such as ethylene glycol, 1,2- and/or 1,3-propylene glycol and 1,4-butanediol, 1,6-hexanediol, neopentyl glycol, 2-ethylhexane-1,3-diol, glycerol, trimethylolpropane, pentaerythritol, sorbitol, and also low molecular mass, hydroxyl group-containing esters of such polyols with aliphatic or aromatic dicarboxylic acids, and also low molecular mass ethoxylation or propoxylation products of such simple polyols, or any desired mixtures of such modified or unmodified alcohols, water, organic polyamines having at least two N—H bonds, or any desired mixtures of such starter molecules. Also suitable are aromatic hydroxy compounds such as bisphenol A, for example. Suitable for the alkoxylation are cyclic ethers such as tetrahydrofuran and/or alkylene oxides such as ethylene oxide, propylene oxide, butylene oxides, styrene oxide or epichlorohydrin, especially ethylene oxide and/or propylene oxide, which can be used in any order or else in a mixture in the alkoxylation.

Suitable polyester polyols are, for example, the polycondensates, known per se, of diols and also optionally triols and tetraols and of dicarboxylic and also optionally tricarboxylic and tetracarboxylic acids or hydroxycarboxylic acids or lactones. Instead of the free polycarboxylic acids it is also possible to use the corresponding polycarboxylic anhydrides or corresponding polycarboxylic esters of lower alcohols for preparing the polyesters.

Examples of diols suitable for this are ethylene glycol, butylene glycol, diethylene glycol, triethylene glycol, polyalkylene glycols such as polyethylene glycol, and also 1,2-propanediol, 1,3-propanediol, butane-1,3-diol, butane-1,4-diol, hexane-1,6-diol and isomers, neopentyl glycol or neopentyl glycol hydroxypivalate. In addition it is also possible for polyols such as trimethylolpropane, glycerol, erythritol, pentaerythritol, trimethylolbenzene or trishydroxyethyl isocyanurate to be used.

As dicarboxylic acids use may be made of phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. The corresponding anhydrides can also be used as acid source.

Where the average functionality of the polyol for esterification is greater than 2, monocarboxylic acids can additionally be used, such as benzoic acid and hexanecarboxylic acid as well.

Hydroxycarboxylic acids which can be used as reaction participants as well in the preparation of a polyester polyol having terminal hydroxyl groups are, for example, hydroxycaproic acid, hydroxybutyric acid, hydroxydecanoic acid, hydroxystearic acid and the like. Suitable lactones are caprolactone, butyrolactone and homologues. Preference is given to caprolactone.

Polycarbonate polyols suitable in accordance with the invention are those obtainable for example by reaction of carbonic acid derivatives, such as diphenyl carbonate, dimethyl carbonate or phosgene, with polyols, preferably diols. Suitable such diols include, for example, ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, di-, tri- or tetraethylene glycol, dipropylene glycol, polypropylene glycols, dibutylene glycol, polybutylene glycols, bisphenol A, tetrabromobisphenol A or else lactone-modified diols.

The diol component preferably contains 40 to 100 wt % of hexanediol, preferably 1,6-hexanediol and/or hexanediol derivatives, preferably those which as well as terminal OH groups have ether groups or ester groups, examples being products obtained by reaction of 1 mol of hexanediol with at least 1 mol, preferably 1 to 2 mol, of caprolactone or by etherification of hexanediol with itself to give the di- or trihexylene glycol. Polyetherpolycarbonate diols as well can be used. The hydroxyl polycarbonates ought to be substantially linear. Optionally, however, they may be slightly branched as a result of the incorporation of polyfunctional components, more particularly low molecular mass polyols. Examples of polyols suitable for this purpose include glycerol, trimethylolpropane, hexane-1,2,6-triol, butane-1,2,4-triol, trimethylolpropane, pentaerythritol, quinitol, mannitol, sorbitol, methylglycoside or 1,3,4,6-dianhydrohexitols. Preferred polycarbonates are those based on hexane-1,6-diol, and also preferred are modifying co-diols such as butane-1,4-diol, for example, or else on ε-caprolactone. Other preferred polycarbonate diols are those based on mixtures of hexane-1,6-diol and butane-1,4-diol.

More preferably the polyol component a) comprises at least one polyether polyol, the polyol component preferably consisting exclusively of polyether polyols. Particularly preferred here are polyether polyols obtained by addition reaction of propylene oxide and/or ethylene oxide onto suitable starter compounds. The polyether polyols preferably have the above-stated number-average molecular weights and OH functionalities, including all of the preferred ranges.

The isocyanate component b) used for preparing the prepolymers A) comprises ≥70 wt %, preferably ≥80 wt % and very preferably ≥90 wt % of at least one aliphatic polyisocyanate and ≤30 wt %, preferably ≤20 wt % and very preferably ≤10 wt % of at least one aromatic polyisocyanate, based on the total weight of component b).

The use of small amounts of aromatic polyisocyanates is especially beneficial for the swelling behaviour of the resulting coatings in water.

Suitable aliphatic polyisocyanates here are all known aliphatic, cycloaliphatic and/or araliphatic polyisocyanates having at least two isocyanate groups, and also mixtures of stated compounds. Examples of suitable aliphatic isocyanates are di- or triisocyanates such as, for example, butane diisocyanate, pentane diisocyanate, hexane diisocyanate (hexamethylene diisocyanate, HDI), 4-isocyanatomethyl-1,8-octane diisocyanate (triisocyanatononane, TIN) or cyclic systems, such as, for example, 4,4'-methylenebis(cyclohexyl isocyanate) (Desmodur® W, Bayer MaterialScience AG, Leverkusen), 3,5,5-trimethyl-1-isocyanato-3-isocyanatomethylcyclohexane (isophorone diisocyanate, IPDI) and also ω,ω'-diisocyanato-1,3-dimethylcyclohexane ($H_6$XDI) or tetramethylxylylene diisocyanate (m- and p-TMXDI), and also xylylene diisocyanate (m- and p-XDI). Preference here is given to HDI and/or IPDI, and especially to mixtures of HDI and IPDI.

Suitable aromatic polyisocyanates here are all known aromatic polyisocyanates having at least two isocyanate groups, and also mixtures of stated compounds. Particularly suitable are aromatic polyisocyanates such as, for example, 1,5-naphthalene diisocyanate, diisocyanatodiphenylmethane (2,2'-, 2,4- and 4,4'-methylenediphenyl diisocyanate, MDI), especially the 4,4' isomer and technical mixtures of the 2,4 and 4,4' isomers, diisocyanatomethylbenzene (2,4- and 2,6-tolylene diisocyanate, TDI). More preferably the aromatic polyisocyanates are TDI and/or MDI, very preferably MDI.

Likewise suitable for the purposes of the invention are the conventional derivatives of the stated isocyanates having biuret, isocyanurate, iminooxadiazinedione, uretdione, allophanate and/or urethane structure.

With preference in accordance with the invention, component b) has an average mean NCO functionality of 1.5 to 4.0, preferably 1.8 to 3.8 and more preferably of 2.0 to 3.5. One polyisocyanate or else mixtures of different polyisocyanates can be used as component b). The average mean functionality is a product of the average value of the functionalities of all the polyisocyanates used for preparing the prepolymer A).

In one preferred embodiment of the invention the terminal isocyanate groups of the isocyanate-terminated prepolymer A) are formed exclusively from the aliphatic polyisocyanates. Terminal isocyanate groups which result from the aromatic polyisocyanates can lead to a deterioration in the storage stability.

Besides components a) and b), further isocyanate-reactive compounds may also be used for preparing the prepolymers A). Preferably, however, only components a) and b) are used.

Low molecular mass polyols, for example, can also be used for preparing the isocyanate-terminated prepolymers A). Suitable low molecular mass polyols are short-chain—i.e. containing 2 to 20 carbon atoms—aliphatic, araliphatic or cycloaliphatic diols or triols. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Preferred are 1,4-butanediol, 1,4-cyclohexanedimethanol and 1,6-hexanediol. Examples of suitable triols are trimethylolethane, trimethylolpropane or glycerol, preferably trimethylolpropane.

Furthermore, besides the short-chain diols, low molecular mass amines or amino alcohols can also be used. Such compounds are di- or polyamines, and also hydrazides, e.g. hydrazine, 1,2-ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4-diaminodicyclohexylmethane, dimethylethylenediamine, hydrazine, adipic dihydrazide, 1,4-bis(aminomethyl)cyclohexane, 4,4'-diamino-3,3'-dimethyldicyclohexylmethane and other ($C_1$-$C_4$)-di- and tetraalkyldicyclohexylmethanes, e.g. 4,4'-diamino-3,5-diethyl-3',5'-diisopropyldicyclohexylmethane. Diamines or amino alcohols contemplated are generally low molecular mass diamines or amino alcohols which contain active hydrogen having differences in reactivity relative to NCO groups, such as compounds which as well as a primary amino group also have secondary amino groups, or as well as an amino group (primary or secondary) also have OH groups. Examples thereof are primary and secondary amines such as 3-amino-1-methylaminopropane, 3-amino-1-ethylaminopropane, 3-amino-1-cyclohexylaminopropane, 3-amino-1-methylaminobutane, and also amino alcohols, such as N-aminoethylethanolamine, ethanolamine, 3-aminopropanol, neopentanolamine and, with particular preference, diethanolamine.

It is also possible, moreover, for monofunctional compounds to be used that are reactive with NCO groups, such as monoamines, especially mono-secondary amines, or monoalcohols. Examples that may be mentioned here include ethanol, n-butanol, ethylene glycol monobutyl ether, 2-ethylhexanol, 1-octanol, 1-dodecanol, 1-hexadecanol, methylamine, ethylamine, propylamine, butylamine, octylamine, laurylamine, stearylamine, isononyloxypropylamine, dimethylamine, diethylamine, dipropylamine, dibutyl amine, N-methylaminopropylamine, diethyl(methyl) aminopropylamine, morpholine, piperidine and suitable substituted derivatives thereof.

The isocyanate-terminated prepolymer A) is prepared by reaction of components a) and b) and optionally further isocyanate-reactive components with one another, preferably by reaction of components a) and b) with one another.

With preference in accordance with the invention the ratio of the isocyanate groups in component b) to hydroxyl groups in component a) selected is ≥1.5:1, preferably ≥2.0:1, more preferably ≥2.1:1. With further preference the ratio of the isocyanate groups in component b) to hydroxyl groups in component a) selected is ≤2.5:1 and preferably ≤2.4:1.

In the preparation of the prepolymer A), the polyol component a) may be introduced initially and then the isocyanate component b) added, or else these operations can be carried out in reverse order. It is preferred here for the aromatic polyisocyanate or polyisocyanates, if present, to be first consumed fully by reaction with the polyol component. Thereafter the aliphatic polyisocyanate or polyisocyanates can then be reacted with the polyol component.

The reaction takes place preferably at temperatures between 23 and 120° C., more preferably between 50 to 100° C. The temperature regime may be varied within this range before and after the addition of the individual components. The reaction can be carried out with addition of usual solvent or in bulk, preferably in bulk.

The terminal isocyanate groups of the prepolymers A) are blocked with dialkyl malonate and/or 3,5-dimethylpyrazole (DMP), preferably with dialkyl malonate.

Suitable blocking agents are DMP and dialkyl malonates, especially those having C1 to C6 alkyl chains, preferably in turn diethyl (C2) and/or dimethyl (C1) malonate, more preferably diethyl malonate (malonic acid diethyl ester). In accordance with the invention the dialkyl malonates may also be used in a mixture with acetylacetonate as blocking agent.

For the purpose of blocking, the isocyanate-terminated prepolymers A) are reacted wholly or partly with the blocking agents.

The blocking agent should be used preferably in an amount such that the equivalence used of the groups in the blocking agent that are suitable for isocyanate blocking correspond to at least 30 mol %, preferably 50 mol %, more preferably more than 95 mol % of the amount of isocyanate groups to be blocked. A small excess of blocking agent may be useful in order to ensure complete reaction of all the isocyanate groups. In general the excess is not more than 20 mol %, preferably not more than 15 mol % and more preferably not more than 10 mol %, based on the isocyanate groups to be blocked. Very preferably the amount of groups in the blocking agent that are suitable for NCO blocking is therefore 95 mol % to 110 mol %, based on the amount of the isocyanate groups to be blocked in the polyurethane prepolymer A).

The blocking with dialkyl malonates is carried out advantageously at temperatures of 23 to 80° C., preferably 40 to 70° C. Preference here is given to using a catalytic amount of a base, particularly sodium methoxide. Following the blocking reaction, the base can be deactivated. This deactivation is accomplished preferably by alkyl phosphates such as dibutyl phosphate, for example. The blocking reaction takes place preferably in the absence of solvents. Following deactivation of the base, usual solvents may be added in order to lower the viscosity of the blocked prepolymers A).

In the case of blocking of the terminal isocyanate groups with DMP, the operating temperatures are advantageously from 23° C. to 100° C., preferably from 40 to 90° C. The DMP is preferably added first to the prepolymer A) in pure solid form. As the reaction progresses, depending on the structure of the prepolymer A), there may be a sharp increase in the viscosity. In that case, usual solvents can then be added in order to limit the increase in the viscosity.

The viscosity of the blocked prepolymers A) obtained is preferably <200 000 mPas, more preferably <150 000 mPas and very preferably <110 000 mPas. This viscosity may also be brought about by addition of organic solvents, in which case ≤30 wt %, preferably ≤20 wt % and more preferably ≤10 wt % of organic solvent is used, based on the total mass of prepolymer A) and solvent.

The coating composition further comprises component B), at least one polyamine. Polyamines are understood in accordance with the invention to be those amines having at least two amino groups. Component B) preferably comprises at least one diamine, and more preferably component B) consists exclusively of one or more diamines. Such polyamines may comprise either primary or secondary amino groups or mixtures thereof. Examples of suitable polyamines include the following: hydrazides, e.g. hydrazine, 1,2-ethylenediamine, 1,2- and 1,3-diaminopropane, 1,4-diaminobutane, 1,6-diaminohexane, isophoronediamine, isomer mixtures of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4-diaminodicyclohexylmethane, dimethylethylenediamine, hydrazine, adipic dihydrazide, 1,4-bis(aminomethyl)cyclohexane, 4,4'-diamino-3,3'-dimethyldicyclohexylmethane and other ($C_1$-$C_4$)-di- and tetraalkyldicyclohexylmethanes, e.g. 4,4'-diamino-3,5-diethyl-3',5'-diisopropyldicyclohexylmethane.

Suitable polyamines contemplated in accordance with the invention also include low molecular mass diamines or amino alcohols which contain active hydrogen having differences in reactivity relative to NCO groups, such as compounds which as well as a primary amino group also have secondary amino groups, or as well as an amino group (primary or secondary) also have OH groups. Examples thereof are primary and secondary amines such as 3-amino-1-methylaminopropane, 3-amino-1-ethylaminopropane, 3-amino-1-cyclohexylaminopropane, 3-amino-1-methylaminobutane, and also amino alcohols, such as N-aminoethylethanolamine, ethanolamine, 3-aminopropanol, neopentanolamine and, with particular preference, diethanolamine.

Suitable polyamines are also secondary polyamines which have ester groups, the so-called polyaspartates. Polyaspartates are obtainable through the reaction of primary polyamines with maleates or fumarates. The primary polyamines here may be selected in particular from ethylenediamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4- and/or 2,4,4-trimethyl-1,6-hexane diamine, 1,7-heptane diamine, 1,8-octane diamine, 1,9-nonane diamine, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diaminodicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bissemicarbazides, phenylene diamine, 2,4- and 2,6-toluylene diamine, 2,3- and 3,4-toluylene diamine, 2,4•- and/or 4,41-diaminodiphenyl methane, higher functional polyphenylene polymethylene polyamines obtained by the aniline/formaldehyde condensation reaction, N,N,N-tris-(2-aminoethyl)-amine, guanidine, melamine, N-(2-aminoethyl)-1,3-propane diamine, 3,3-diamino-benzidine, polyoxypropylene amines, polyoxyethylene amines, mixed propylene oxide/ethylene oxide diamines (such as 3,3•-[1,2-ethanediylbis(oxy)]bis (1-propaneamine)), 2,4-bis-(4•-aminobenzyl)-aniline and mixtures thereof. Preferred primary polyamines are 1-amino-3-aminomethyl-3,5,5-trimethylcyclohexane (isophorone diamine or IPDA), bis-(4-aminocyclohexyl)methane, bis-(4-amino-3-methylcyclohexyl)-methane, 1,6-diamino-hexane, 2-methyl pentamethylene diamine, ethylene diamine and 3,3•-[1,2-ethanediylbis(oxy)]bis (1-propaneamine).

Suitable polyaspartates and their preparation are described for example in patent applications US 2005/0159560 A1, EP 0403921 A1, EP 0470461 A1 and also in U.S. Pat. Nos. 5,126,170, 5,214,086, 5,236,741, 5,243,012, 5,364,955, 5,412,056, 5,623,045, 5,736,604, 6,183,870, 6,355,829, 6,458,293 and 6,482,333 and published European Patent Application 667,362. In addition, aspartates containing aldimine groups are also known (see U.S. Pat. Nos. 5,489,704, 5,559,204 and 5,847,195). Secondary aspartic acid amide esters are also known (see U.S. Pat. No. 6,005,062).

Preference in accordance with the invention is given to using sterically hindered diamines or mixtures thereof as component B).

With very particular preference component B) comprises or consists of 4,4'-diamino-3,3'-dimethyldicyclohexylmethane.

The coating composition comprises preferably 5 to 50 wt % and more preferably 10 to 30 wt % of component B), based on the total mass of the coating composition.

The coating composition of the invention comprises ≤30 wt %, preferably ≤15 wt % and more preferably ≤10 wt %, based on the total mass of coating composition, or at least one organic solvent. The coating composition may therefore be identified as low-solvent. With particular advantage the coating compositions are free from organic solvents.

Organic solvents used may be any of the solvents usual within the textile industry, particular suitability being possessed by esters, alcohols, ketones, for example butyl acetate, methoxypropyl acetate, methylethyl ketone, or mixtures of these solvents. Methoxypropyl acetate is particularly preferred.

The organic solvent may be added together with component A), with component B), or else separately before, during or after the mixing of A) and B). The organic solvent is preferably introduced together with component A) into the composition or is added after mixing of components A) and B).

In one preferred embodiment the coating composition comprises no water.

The weight ratio of component A) to component B) in the coating composition of the invention is preferably ≤10:4, more preferably ≤10:3.5 and very preferably ≤10:3.

The ratio of component A) to component B) is preferably selected such that amine groups are present relative to blocked NCO groups in an equivalents ratio of 0.8 to 1.1, more preferably of 0.9 to 1.05 and very preferably of 0.95 to 1.0.

The coating compositions of the invention may further comprise the auxiliaries and adjuvants that are known per se in the processing of textile coatings, such as pigments, UV stabilizers, antioxidants, fillers, propellants, matting agents, hand assistants, antifoams, light stabilizers, plasticizers and/or flow control assistants. These auxiliaries and adjuvants are present preferably at a concentration ≤15 wt %, more preferably 0.01% to 10 wt %, based on the total weight of the coating composition.

In one preferred embodiment of the invention the coating composition comprises 30 to 90 wt % of component A), 2 to 50 wt % of component B), 0 to 15 wt % of at least one organic solvent and 0 to 15 wt % of auxiliaries and adjuvants, with components A), B), the organic solvent and the auxiliaries and adjuvants adding up to 100 wt %.

The coating composition is prepared preferably by the mixing of all the components at 20 to 30° C. for 20 to 50 minutes. Advantageously, in particular, components A) and B) are first of all stored separately and are not mixed until as short a time as possible before the application or processing of the coating composition.

Directly after the components have been mixed, the coating composition preferably has a viscosity which allows the coating composition to be processed by the usual methods employed in the textile industry, more particularly by doctor blade application. The viscosity of the coating composition here may be influenced by auxiliaries and adjuvants, such as those identified above, for example.

The coating composition ought to be workable still for at least 4 hours after mixing.

A further subject of the invention is a method for coating substrates wherein the coating composition of the invention is applied to a substrate and is crosslinked at 90 to 200° C., preferably at 110 to 180° C. and very preferably at 130 to 170° C. This crosslinking is accomplished by reaction of components A) and B) with one another, triggered in particular by exposure to temperature. As a result of the temperature exposure, the blocked polyisocyanate A) first undergoes at least partial transition, preferably, into a nonblocked form, with the blocked polyisocyanate A) here more preferably undergoing complete transition into a nonblocked form. The deblocked isocyanate groups are then able to react fully with the amino groups of component B), with crosslinking.

The crosslinking takes place, with particular preference, using temperature profiles in which the temperature is raised in stages within the stated temperature range over the course of the crosslinking time.

The crosslinking time with exposure to temperature amounts in total preferably to 1 to 15 minutes, more preferably to 2 to 10 minutes and very preferably to 2 to 5 minutes. The coating compositions of the invention can be applied in one or more layers to the substrate.

The coating composition can be applied to the substrate with the customary application or coating equipment, as for example a doctor blade, e.g. a bar coater, rolls, or other devices. Printing and spraying are also possible. Application by doctor blade coating is preferred. Application may take place on one or both sides. Application may take place directly or via transfer coating, preferably via transfer coating.

Quantities of 100 to 1000 g/m² are applied to the substrate preferably in the method of the invention.

Suitable substrates are preferably textile materials, sheet-like substrates made of metal, glass, ceramic, concrete, natural stone, leather, natural fibres, and plastics such as PVC, polyolefins, polyurethane, or the like. Three-dimensional structures as well are suitable support materials. More preferably the substrate is a textile material or leather, very preferably a textile material.

Textile materials are understood within the meaning of the present invention to refer, for example, to woven fabrics, knitted fabrics, and bonded and non-bonded nonwoven webs. The textile materials may be constructed from synthetic fibres, natural fibres and/or blends thereof. In principle, textiles made of any desired fibres are suitable for the method of the invention. As a result of the coating composition of the invention, the substrates can be treated or enhanced in all customary ways, preferably by coating or adhesive bonding of the fibres to one another and/or of substrates with one another.

The coated textile substrates, before, during or after the application of the coating composition of the invention, may be surface-treated, by means of preliminary coating, peaching, velourizing, raising and/or tumbling, for example.

In textile coating, a multi-layer construction is frequently employed. The coating in that case consists preferably of at least two layers, which are generally referred to also as coats. The uppermost layer, facing the air, is called the topcoat. The lowermost side, facing the substrate and joining the topcoat or other coats in the multi-layer construction to the textile, is also referred to as the tie coat. Between these there may be one or more layers applied, which are referred to generally as intercoats.

Through the coating method of the invention, in conjunction with textile materials, topcoats, intercoats and also tie coats can be produced. The method is especially suitable for the production of intercoats. These intercoats may be in compact or foamed form. In order to produce foamed intercoats, blowing agents may be employed. Blowing agents suitable for this purpose are known from the prior art.

Another particularly advantageous feature of the compositions of the invention is that they can be used to produce thick layers with only one or very few coats.

Likewise a subject of the invention is a coated substrate obtainable by the method of the invention.

On account of the outstanding performance properties, the coating compositions of the invention and the coats or adhesive bonds produced from them are suitable with preference for the coating or production of outerwear clothing, artificial leather articles, such as footwear, furniture coverings, automotive interior trim articles and sports implements, this list being merely illustrative and not limiting.

Furthermore, the use of the coating composition of the invention for producing elastic coatings or elastic films is a subject of the invention.

Elastic films and coatings in the sense of this invention preferably have an elongation at break of ≥200% and/or a tensile strength of ≥2 MPa and a 100% modulus of ≥0.2 MPa.

The elastic films or coatings preferably have a swellability in water of ≤50%, more preferably ≤30% and very preferably ≤10%.

The stated physical properties are determined here as set out in the Methods section.

The present invention is illustrated using examples, which should not be interpreted as limiting.

EXPERIMENTAL PART

Methods:
Data given in percent is based on mass, if not explicitly explained in a different way.

The concentration of isocyanate groups (NCO) have been determined by volumetric titration according to DIN EN ISO 11909.

All viscosity measurements have been carried out with a rheometer from Anton Paar, Germany (Physica MCR 301) according to DIN EN ISO 3219.

Viscosity 1: Viscosity of the prepolymer A) after having settled for at least 12 h at room temperature Viscosity 2: Viscosity directly after addition of diamine Viscosity 3: Viscosity 7 h after addition of diamine The difference between viscosity 2 and viscosity 3 shows the pot life of the composition at room temperature.

The measurements of the 100% modulus, the elongation at break and the tensile strength are carried out according to DIN 53504.

Swelling in Water:
Free films are swollen in water over 24 hours at room temperature to determine the swelling rate. The change of the volume of the film after swelling is determined with a ruler. A film with a thickness of 0.1-0.2 mm is cut into a sample of 50×50 mm and stored for 2 hours in water. The calculation of the swelling is carried out under the assumption that the change is proportional in all dimensions.

The number-average molecular weight Mn is determined by gel permeation chromatography (GPC) in tetrahydrofuran at 23° C. The procedure for this is in accordance with DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 µm; RID detector). Calibration takes place using polystyrene samples of known molar mass. The number-average molecular weight is calculated with software assistance. Baseline points and evaluation limits are specified in accordance with DIN 55672 Part 1.

Description of Raw Materials:
All of the following raw materials were supplied by Covestro Deutschland AG Polyol 1: Trifunctional polyether based on propylene oxide and ethylene oxide started with glycerol, number average molecular weight $M_n$=6000 g/mol Polyol 2: Trifunctional polyether based on propylene oxide and ethylene oxide started with glycerol, number average molecular weight $M_n$=4800 g/mol Polyol 3: Polypropylene oxide ether started with bisphenol A, number average molecular weight $M_n$=560 g/mol Polyol 4: Trifunctional polyether based on propylene oxide started with trimethylol propane, number average molecular weight $M_n$=437 g/mol Polyol 5:
Polyester polyol based on adipic acid, trimethylol propane, 1,6-hexane diol, iso-phthalic acid and phthalic acid, Mn=1200 g/mol Polyisocyanate 1:
Hexamethylene-1,6-diisocyanate (HDI)

Polyisocyanate 2:
Isophorone diisocyanate (IPDI)

Polyisocyanate 3:
4,4'-Methylene-bis-(phenylisocyanate), pure 4,4'-isomer (MDI)

Polyisocyanate 4: Polyisocyanate based on hexamethylene diisocyanate, concentration of free NCO-groups approximately 20%, Mn=655 g/mol Polyisocyanate 5: Toluylene diisocyanate, isomeric mixture (20% 2,6-toluylene diisocyanate and 80% 2,4-toluylene diisocyanate)

Diamine 1: 4,4'-Diamino-3,3'-dimethylene dicyclohexyl-methane (Laromin C 260, BASF, Germany)

All further raw materials were supplied by Sigma Aldrich and used without further purification if not mentioned otherwise.

b) Blocking with 3,5-Dimethyl Pyrazole

The reaction mixture is adjusted to 65° C. At this temperature 3,5-dimethyl pyrazole is added and reacted. Depending on the increase of the viscosity methoxypropyl acetate is added during the reaction to the mixture and stirred until the reaction with the isocyanate groups is complete (according to NCO titration).

Table 1 shows Examples 1 to 9 prepared according to procedures a) or b) and their compositions.

TABLE 1

| Material | Example 1 Amount (g) | Example 2 Amount (g) | Example 3 Amount (g) | Example 4 Amount (g) | Example 5 Amount (g) | Example 6 Amount (g) | Example 7 Amount (g) | Example 8 Amount (g) | Example 9 Amount (g) |
|---|---|---|---|---|---|---|---|---|---|
| Polyol 1 | 765.0 | 765.0 | 612.2 | 0 | 546.5 | 765.0 | 765.0 | 0 | 0 |
| Polyol 2 | 0 | 0 | 0 | 612.2 | 0 | 0 | 0 | 647.9 | 647.9 |
| Polyol 3 | 47.9 | 47.9 | 47.9 | 47.9 | 34.2 | 47.0 | 47.9 | 61.7 | 61.7 |
| Polyol 4 | 0 | 0 | 0 | 46.1 | 0 | 0 | 0 | 44.0 | 44.0 |
| HDI | 46.1 | 46.1 | 46.1 | 46.1 | 48.2 | 41.5 | 41.5 | 75.1 | 82.6 |
| IPDI | 64.8 | 64.8 | 64.8 | 64.8 | 67.8 | 64.8 | 64.8 | 105.9 | 116.4 |
| MDI | 0 | 0 | 0 | 0 | 0 | 7.2 | 7.2 | 0 | 0 |
| Polyisocyan. 4 | 0 | 0 | 85.0 | 0 | 78.0 | 0 | 102.0 | 0 | 0 |
| Diethyl malonate | 93.1 | 0 | 166.5 | 0 | 183.2 | 91.8 | 169.4 | 148.0 | 7.0 |
| Sodium methoxide (30% in methanol) | 3.3 | 0 | 6.5 | 0 | 6.0 | 3.0 | 6.0 | 5.0 | 7.0 |
| Methoxypropyl acetate (Content of solvent in wt. %) | 112.0 (9.9) | 52.0 (5.1) | 55.0 (5.1) | 44.0 (4.8) | 55.0 (5.4) | 55.0 (5.1) | 65.0 (5.1) | 58.0 (5.1) | 60.0 (5.0) |
| Di-n-butyl phosphate | 1.5 | 0 | 3.2 | 0 | 3.0 | 1.5 | 3.0 | 2.5 | 3.5 |
| 3,5-Dimethyl pyrazole | 0 | 50.7 | 0 | 55.8 | 0 | 0 | 0 | 0 | 0 |
| Viscosity 1 (mPas) | 25.200 | 24.500 | 50.000 | 25.000 | 32.900 | 78.000 | 105.000 | 105.000 | 90.000 |

General Procedure:

The polyol mixture is stirred at 100° C. for 1 hour at approximately 10 mbar to remove excess of water. If MDI is a part of the prepolymer the calculated amount of MDI is added at 65° C. and reacted until the NCO has fallen to zero. Afterwards, a mixture containing hexamethylene diisocyanate (HDI) and isophorone diisocyanate (IPDI) is added within 1-2 minutes at 90° C. and stirred until the theoretical NCO value is reached. If the experiment is carried out without MDI the HDI/IPDI-mixture is directly added to the polyol mixture at 90° C. and reacted until the theoretical NCO value has been reached. The prepolymer mixture is cooled to 60-65° C. If the reaction mixture contains the Polyisocyanate 4 this material is added to the NCO-prepolymer at this point.

The reaction of the free NCO groups with the blocking agent is carried out according to the two procedures which follow:

a) Blocking with Diethyl Malonate

At 60°-65° C. a mixture of diethylmalonate and sodium methoxide solution (30% (w/w) in methanol) is added to the reaction mixture and stirred at this temperature until the NCO-value has dropped to zero. If the viscosity of the reaction mixtures is increasing significantly the given amount of solvent (methoxypropyl acetate (MPA)) is added during this reaction step. If the viscosity is not increasing very fast the amount of MPA is added after the reaction of the diethylmalonate with the isocyanate groups is complete (according to NCO titration).

In the final step di-n-butyl phosphate is added to neutralize the methoxide base.

Evaluation of Prepolymer: Film Formation by Crosslinking with Diamine

The prepolymer (example 1 to example 9) is mixed with a stoichiometric amount of Diamine 1 and 3.0% of Additive for polyurethane-based synthetic leather (BYK Chemie GmbH, Germany) and 0.5% of Acronal L 700 (Acrylic resin in 50% ethyl acetate, plasticizer for coatings applications, BASF, Germany). The amount of Diamine 1 is calculated in a way that the mixture contains the same amount of amine and ester equivalents. The mixture is stirred for 3 minutes under vacuum. Then a film is generated on Bor supermatt paper with a blade (300 µm wet). The film is dried according to the temperature programme which follows:

1 min 90° C., temperature increase from 90° C. to 130° C. within 1 minute 1 min 130° C., temperature increase from 130° C. to 160° C. within 2 minutes 5 min 160° C.

(curing carried out in a circulating air oven)

The viscosities and film properties were determined according to the above mentioned methods.

Table 2 summarizes the results of the measurements for examples 1 to 9 (corresponding to prepolymers 1 to 9).

The results of table 2 show that elastic films with a wide range of mechanical strengths and elastic properties can be designed with the technology of this invention. The pot life of the formulation allows the processing throughout a working day.

TABLE 2

| | Example 1 | Example 2 | Example 3 | Example 4 | Example 5 | Example 6 | Example 7 | Example 8 | Example 9 |
|---|---|---|---|---|---|---|---|---|---|
| Viscosity 2 Start (mPas) | 15.200 | 36.700 | 56.000 | 16.400 | 14.400 | 81.000 | 53.500 | 62.400 | 42.000 |
| Viscosity 3 after 7 hrs (mPas) | 30.500 | 61.400 | 71.400 | 20.000 | 32.900 | 106.000 | 80.000 | 108.000 | 71.000 |
| 100% Modulus (MPa) | 0.68 | 0.40 | 0.82 | 1.16 | 2.80 | 0.70 | 2.03 | 1.98 | 3.03 |
| Tensile Strength (MPa) | 2.66 | 2.4 | 3.56 | 10.92 | 3.6 | 5.85 | 8.66 | 6.7 | 12.08 |
| Elongation at break (%) | 537 | 1040 | 992 | 1463 | 256 | 1068 | 488 | 719 | 707 |
| Swelling in Water (%) | 48 | Film destroyed | 26 | 19 | 19 | 33 | 19 | 13 | 0 |

Comparative Examples

Aliphatic Prepolymers Malonate-Blocked Crosslinked with Polyol 5

Crosslinking of selected malonate-blocked prepolymers is carried out with Polyol 5.

Procedure for Film Preparation:

The prepolymers from examples 3 (comparative example 1) or 7 (comparative example 2) and the Polyol 5 were mixed in a speedmixer at 3500 rpm for 1 minute. The amount of Polyol 5 is calculated in a way that the mixture contains the same amount of hydroxyl and ester equivalents.

Then a film is generated on polyethylene-coated paper with a blade (500 μm wet). The film is dried according to the temperature programme which follows:
30 min 70° C.
10 min 90° C.
10 min 120° C.
10 min 150° C.

All obtained films are very soft and tacky. A sample for measuring the tear strength could not be prepared because the films were destroyed during delamination from the paper. Hence a diamine crosslinker is needed to generate films with a good mechanical stability.

Aromatic Prepolymer Malonate-Blocked: Determination of Pot Life in Combination with Diamine 1

Synthesis:

A polyol mixture out of 774.0 g polyol 1 and 48.4 g polyol 3 was stirred at 100° C. for 1 hour at approximately 10 mbar to remove excess of water. A mixture consisting of 69.4 g polyisocyanate 3 and 50.6 g polyisocyanate 5 is added to the mixture at 65° C. and stirred at this temperature until the theoretical NCO value has been reached. 60 g of this prepolymer was used for the blocking step with diethyl malonate.

A mixture of 60 g of the prepolymer prepared above and 7.0 g methoxypropyl acetate (MPA) was heated to 60° C. A mixture of 5.85 g diethylmalonate and 0.20 g sodium methoxide solution (30% (w/w) in methanol) is added to the reaction mixture and stirred at 60° C. until the NCO-value has dropped to zero.

In the final step 0.1 g di-n-butyl phosphate is added to neutralize the methoxide base.

Determination of Pot Life:

15 g of the malonate-blocked prepolymer prepared above and 1.75 g of Diamine 1 were mixed in a speedmixer for 1 min at 3500 rpm. The amount of Diamine 1 is calculated in a way that the mixture contains the same amount of amine and ester equivalents. The starting viscosity of the prepolymer was 136.000 mPas, the addition of the low-viscous crosslinker amine should reduce the viscosity of the mixture. However, 2 minutes after preparation of the mixture the viscosity of this mixture increased to 875.000 mPas. After 30 min the viscosity increased to 1,100,000 mPas. The reaction of the two components at room temperature is very fast and hence the pot life of the composition is not sufficient for a technical application.

The invention claimed is:

1. A coating composition for the elastic coating of textile materials, comprising
at least one blocked, isocyanate-terminated prepolymer (component A), the isocyanate-terminated prepolymer A) being prepared from a polyol component a) and an isocyanate component b), and the terminal isocyanate groups being blocked with dialkyl malonate and/or 3,5-dimethylpyrazole, and the isocyanate component b) containing ≥70 wt % of at least one aliphatic polyisocyanate and ≤30 wt % of at least one aromatic polyisocyanate, based on the total weight of component b), the polyol component a) comprises a mixture comprising at least one polyol having a number-average molecular weight Mn of 2500 to 7000 g/mol, determined by means of GPC in tetrahydrofuran at 23° C., and having an average OH functionality of 1.8 to 3.0, and at least one polyol having a number-average molecular weight Mn of 300 to 1000 g/mol, determined by means of GPC in tetrahydrofuran at 23° C., and having an average OH functionality of 2.8 to 3.5;
at least one polyamine (component B) and
≤30 wt %, based on the total mass of the coating composition, of at least one organic solvent, and wherein the composition forms an elastic coating having an elongation at break of ≥200%, a tensile strength of ≥2 MPa and a 100% modulus of ≥0.2 MPa according to DIN 53504.

2. The coating composition according to claim 1, wherein the terminal isocyanate groups of the isocyanate-terminated prepolymer A) come exclusively from the aliphatic polyisocyanates.

3. The coating composition according to claim 1, wherein the coating composition comprises ≤10 wt %, based on the total mass of coating composition, of at least one organic solvent.

4. The coating composition according to claim 1, wherein the terminal isocyanate groups of the prepolymer A) are blocked with dialkyl malonate.

5. The coating composition according to claim 1, wherein component B) comprises at least one diamine or consists exclusively of one or more diamines.

6. The coating composition according to claim 1, wherein component b) comprises ≥80 wt % of at least one aliphatic polyisocyanate and ≤20 wt % of at least one aromatic polyisocyanate, based on the total weight of component b).

7. The coating composition according to claim 1, wherein the ratio of the isocyanate groups in component b) to hydroxyl groups in component a) is ≥1.5:1.

8. The coating composition according to claim 1, wherein component b) has an average NCO functionality of 1.5 to 4.0.

9. The coating composition according to claim 1, wherein the weight ratio of component A) to component B) is ≤10:4.

10. A method for coating substrates, comprising applying the coating composition according to claim 1 to a substrate and crosslinking at 90 to 200° C.

11. The method according to claim 10, wherein the substrate is a textile material.

12. Coated substrate obtained by a method according to claim 10.

13. A method comprising applying to a textile substrate the coating composition according to claim 1 in order to produce elastic coatings or elastic films.

* * * * *